Patented Mar. 15, 1927.

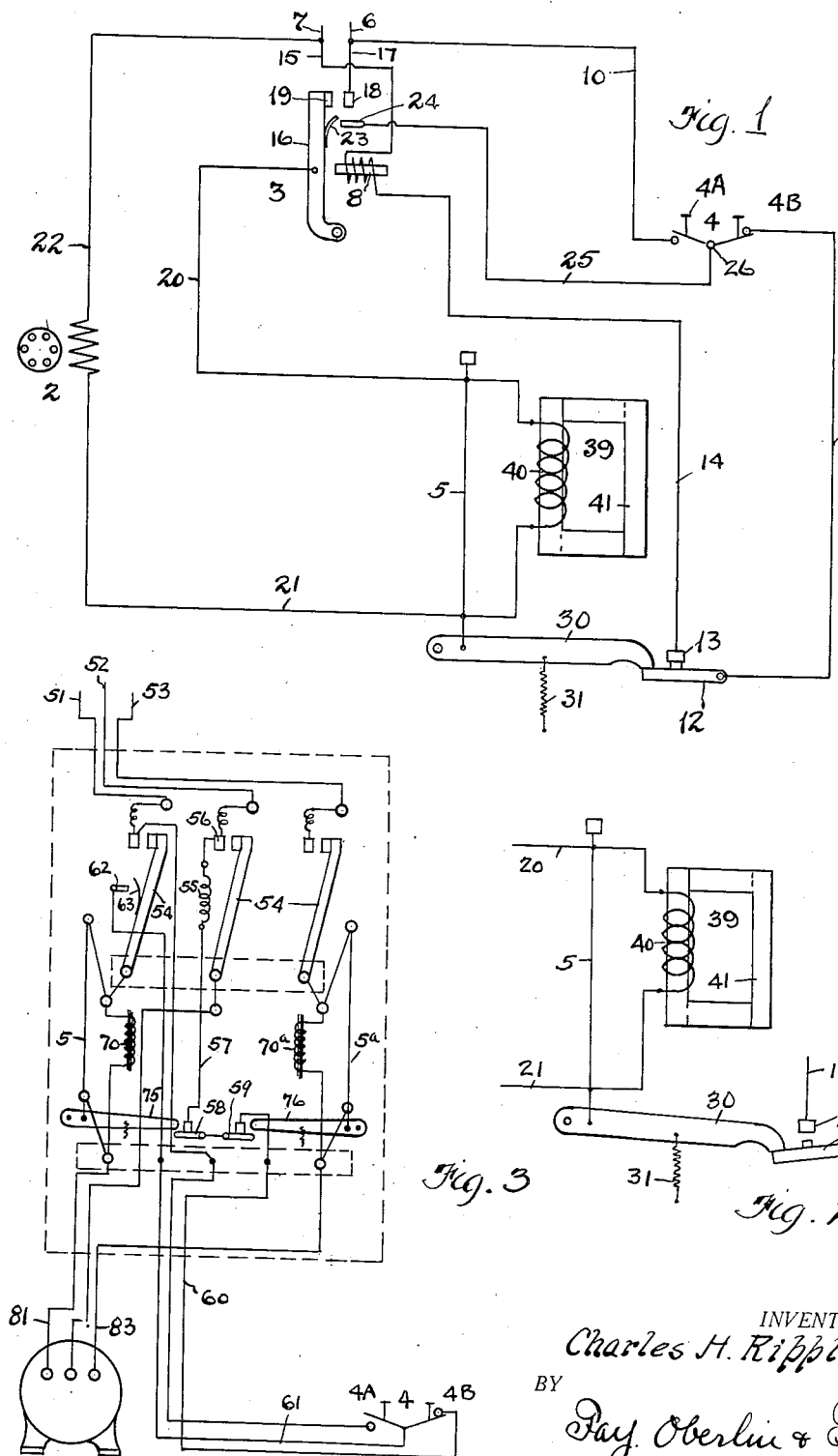

1,621,173

UNITED STATES PATENT OFFICE.

CHARLES H. RIPPL, OF EAST CLEVELAND, OHIO, ASSIGNOR TO THE CLARK CONTROLLER COMPANY, OF CLEVELAND, OHIO, A CORPORATION OF OHIO.

OVERLOAD DEVICE FOR ALTERNATING-CURRENT MOTORS.

Application filed August 18, 1926. Serial No. 130,089.

The present invention relates to overload devices for alternating current motors, particularly of the induction motor type. In starting an induction motor, an overload device must be provided which will allow the motor to receive the starting current, which may vary from two hundred per cent to one thousand per cent of full load current, for the time, usually not to exceed ten seconds, necessary to bring the motor up to speed. The present overload device is of the hot or expanding wire type, this wire being normally set to trip and open the motor circuit upon moderate overloads of about one hundred and twenty-five per cent of full load current after a predetermined length of time, usually between thirty seconds and one minute. The present invention is to provide with the hot wire, tripping or circuit breaking device, an overload device preferably in the form of a reactor in parallel with the hot wire which will handle the high starting currents and at the same time allow the hot wire to function in its usual manner for other overload currents. To the accomplishment of the foregoing and related ends, said invention, then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a wiring diagram showing the invention applied to a single phase motor; Fig. 2 is a wiring diagram of the overload device in its open or tripped position; and Fig. 3 is a wiring diagram showing the device applied to a three-wire system such as either a two-phase three-wire system, or a three-phase three-wire system.

In Fig. 1, there is shown the motor 2, the main contactor 3, the starting and stopping switch 4, the hot wire 5. The motor current is carried by the live wires 6 and 7, and the motor is started by closing the circuit through the solenoid winding 8 of the contactor 3 by momentarily closing the starting switch 4$^A$, thus closing the circuit through the wire 10, switch 4$^A$, switch 4$^B$, wire 11, the trip contact 12, the contact 13, wire 14, winding 8 and wire 15 to the other live terminal 7. As soon as the solenoid is energized, the contactor switch member 16 is closed thus connecting terminal 6, through wire 17 and contacts 18 and 19 and the member 16 to the hot wire 5 by the wire 20 and then through wire 21 to the motor and then to the other terminal 7 by wire 22. At the same time the solenoid winding is connected in circuit, from the terminal 6, through wire 17, contacts 18 and 19, contactor member 16 through a second contact 23 on the member, to a contact 24 which is connected by a wire 25 to the center terminal 26 of the switch 4, and thus through the switch 4$^B$, wire 11, contacts 12 and 13, and wires 14 and 15 to the terminal 7.

To stop the motor it is only necessary to break the circuit through the solenoid winding 8 by momentarily opening switch 4$^B$, which allows the main contactor to open and break the motor circuit. The hot wire device consists of the wire 5 suitably mounted and connected at its lower end to a pivoted lever 30 which normally rests upon the pivoted contact member 12 and tends to force this contact to the open position as shown in Fig. 2 by the tension of a suitable spring 31. The wire when of normal length holds the lever 30 against movement by the spring, but when the wire elongates due to excessive heating by overload currents, the spring pulls the lever 30 down and opens the circuit through the solenoid winding 8, thus opening the motor circuit through the contactor.

The overload device in the present construction is a reactor 39 mounted in parallel with the hot wire and consisting of an impedance or choke coil 40 wound on a suitable closed laminated core 41. The relation between the reactor 39 and the hot wire 5 is such that under normal full load conditions, the wire 5 must carry its normal predetermined current and operate in its usual manner but under starting conditions, the relation changes and allows a greater portion of the extra starting current to pass through the coil and around the hot wire for sufficient time to bring the motor to full load speed and normal current consumption. Small increases in current, such as loads of from 125 to 150 per cent of full load current are so divided as to force sufficient current through the hot wire, to make it function in its usual manner. The action of the reactor may be determined very closely and by using a core which is nearly saturated at normal full load current, the desired changes in resistance relationship between coil and hot wire may be obtained for both high and low overload currents.

In Fig. 3 a three wire system is shown with a suitable motor. In this arrangement the live wires 51, 52 and 53 are each provided with a separate contactor switch arm 54, all actuated from a solenoid winding 55, which is connected to one of the contactor terminals 56 and then through wire 57 and both overload trip members 58 and 59 which are connected in series and are then connected through a wire 60 to the stopping switch 4$^B$, the center terminal of the switch and wire 61 to a contact 62 which is engaged by an extra contact 63 on one of the other arms 54 and through this contactor arm to the live wire 51. In this form two hot wires 5 and 5$^A$ are employed, one being placed with its overload coil 70 in parallel between the contactor for live wire 51 and the motor terminal 81 and the other 70$^a$ between the live wire 53 and its contactor and its motor terminal 83, these two hot wires operating the trip levers 75 and 76 which act against the contact members 58 and 59 respectively.

By using a reactor in parallel with the hot wire, a very close control may be obtained, the coil and its core being designed, of course, with reference to the motor currents to be handled. Under short circuit conditions, when the currents are very high, the impedance of the reactor coil drops to practically the resistance value of the coil wire itself, but under these conditions which is after the saturation point of the core is reached, increases of current will so divide that the hot wire will expand very rapidly and open the circuit approximately as soon as if no reactor were employed.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In overload devices for induction motors, the combination of a motor circuit including a main magnetic contactor switch, an expansive hot wire and circuit breaker in said motor circuit, and a reactor in parallel with said hot wire, said reactor being so wound as to permit normal overload starting currents to divide between said reactor and said coil in such proportion as to provide sufficient time to bring the motor to normal speed without breaking the circuit, but being so arranged as to divide other overload currents in such proportion as to force said expansive wire to operate said circuit breaker in the desired times for such other overloads.

2. In overload devices for induction motors, the combination of a motor circuit including a main magnetic contactor switch, an expansive hot wire and circuit breaker in said motor circuit, and a reactance coil wound on a closed magnetic core and connected in parallel with said hot wire, said reactance coil and core being adapted to divide the normal high starting currents in such proportions as to allow the necessary time for bringing the motor to normal speed without opening said circuit but being so made as to divide other overload currents in such proportions as to cause said hot wire to open said circuit breaker after the desired time lengths for such other overload currents.

3. In overload devices for induction motors, the combination of a motor circuit including a main magnetic contactor switch, an expansive hot wire in said motor circuit, a second circuit including the winding of said contactor switch, a circuit breaker in said second circuit and connected to said hot wire, a reactor connected in parallel with said hot wire, and adapted to divide the flow of current in definite proportions between said hot wire and said reactor, said reactor being so designed as to allow the normal high starting current to so divide as to prevent actuation of said circuit breaker during the time necessary to bring the motor up to normal speed, but having such resistance characteristics under other varying current loads as to cause other overload currents to heat said wire and open the circuit after predetermined time lengths.

4. In overload devices for induction motors, the combination of a motor circuit including a main magnetic contactor switch, an expansive hot wire in said motor circuit, a second circuit including the winding of said contactor switch, a circuit breaker in said second circuit and connected to said hot wire, a reactor comprising a reactance coil wound on a closed core connected in parallel with said hot wire, said coil and core being so designed as to provide a nearly saturated core at normal full load current and thus divide overload currents and force definite amounts thereof through said hot wire to actuate said circuit breaker and protect said motor, said reactor however being so designed as to divide the normal starting current so as to prevent actuation of said circuit breaker for a time sufficient to bring the motor to full normal speed and current but of such characteristics as to divide other overload currents in such proportions as to cause said hot wire to actuate said circuit breaker after varying times for varying current, such times being short enough to thoroughly protect the motor from overheating.

Signed by me this 10th day of August, 1926.

CHARLES H. RIPPL.